US010480676B2

(12) United States Patent
Komatsuzaki et al.

(10) Patent No.: US 10,480,676 B2
(45) Date of Patent: Nov. 19, 2019

(54) VALVE

(71) Applicant: SMC CORPORATION, Chiyoda-ku (JP)

(72) Inventors: Hisashi Komatsuzaki, Moriya (JP); Hisataka Kato, Joso (JP); Motohiro Soutome, Ayase (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/661,161

(22) Filed: Jul. 27, 2017

(65) Prior Publication Data

US 2018/0031140 A1    Feb. 1, 2018

(30) Foreign Application Priority Data

Aug. 1, 2016  (JP) ................................ 2016-151045
Mar. 1, 2017  (JP) ................................ 2017-038066

(51) Int. Cl.
    *F16K 31/385*    (2006.01)
(52) U.S. Cl.
    CPC ................................. *F16K 31/385* (2013.01)
(58) Field of Classification Search
    CPC ................................................. F16K 31/385
    See application file for complete search history.

(56) References Cited

U.S. PATENT DOCUMENTS 4,029,296 A * 6/1977 Hartmann ............... F16K 7/126
                                                      251/331
4,175,590 A * 11/1979 Grandclement ......... B29C 65/08
                                                      137/883
4,971,106 A * 11/1990 Tsutsui ................ G05D 23/1393
                                                      137/597

(Continued)

FOREIGN PATENT DOCUMENTS

CN          2718345 Y        8/2005
CN         101270815 A       9/2008
(Continued)

OTHER PUBLICATIONS

Chinese Office Action dated Jul. 18, 2019 in Chinese Patent Application No. 201710632270.8 w/English translation, therein 21 pp.

*Primary Examiner* — Eric Keasel
(74) *Attorney, Agent, or Firm* — Oblon, McClelland, Maier & Neustadt, L.L.P.

(57) ABSTRACT

A valve includes a valve mechanism capable of switching a communication state between a first port and a second port of a body. A diaphragm is held between a valve plug and a holder member, at a central portion of the valve mechanism. An outer marginal portion of the diaphragm is held between the body and the bonnet. A pilot channel through which a communication chamber in the body and a pilot chamber in the bonnet communicate with each other is formed in the valve plug. A first hole communicating with the pilot channel is formed at a central portion of the diaphragm. Pres- (Continued)

surized fluid in the communication chamber flows into the pilot chamber through the pilot channel and the first hole to thereby bias the valve plug toward a valve seat, by the pressure of the pressurized fluid in combination with an elastic force of a spring.

12 Claims, 9 Drawing Sheets

(56) References Cited

U.S. PATENT DOCUMENTS

| | | | | |
|---|---|---|---|---|
| 5,133,382 | A | * | 7/1992 | Nielsen ................. F16K 31/402 |
| | | | | 137/549 |
| 5,217,043 | A | * | 6/1993 | Novakovic ........... F16K 31/385 |
| | | | | 137/460 |
| 5,464,064 | A | * | 11/1995 | Weingarten ............ A62C 35/64 |
| | | | | 137/72 |
| 6,290,203 | B1 | * | 9/2001 | Kolze ................... F16K 31/402 |
| | | | | 251/30.02 |
| 8,770,547 | B2 | * | 7/2014 | Takeuchi ............ F16K 27/0236 |
| | | | | 251/331 |
| 8,960,638 | B2 | * | 2/2015 | Da Pont ................ F16K 31/404 |
| | | | | 251/129.15 |
| 2012/0193564 | A1 | | 8/2012 | Takeuchi et al. |

FOREIGN PATENT DOCUMENTS

| | | |
|---|---|---|
| CN | 202402763 U | 8/2012 |
| CN | 103363149 A | 10/2013 |
| CN | 204647411 U | 9/2015 |
| JP | 3095983 | 10/2000 |

* cited by examiner

VALVE

CROSS-REFERENCE TO RELATED APPLICATIONS

This application is based upon and claims the benefit of priority from Japanese Patent Applications No. 2016-151045 filed on Aug. 1, 2016 and No. 2017-038066 filed on Mar. 1, 2017, the contents all of which are incorporated herein by reference.

BACKGROUND OF THE INVENTION

Field of the Invention

The present invention relates to a valve connected to a pipe or the like through which a pressurized fluid flows. The valve is capable of switching the flow state of the pressurized fluid.

Description of the Related Art

Conventionally, valves connected to a fluid channel as a passage of pressurized fluid, and used for controlling the flow state of the pressurized fluid have been used. For example, Japanese Patent No. 3095983 discloses a valve of this type. The valve includes a body having a passage of pressurized fluid, a bonnet covering an upper part of the body, and a valve unit provided movably inside the body and the bonnet. The valve unit includes a valve plug for closing the passage, a diaphragm covering an upper part of the valve plug, and a retainer for holding a central portion of the diaphragm between the center of the valve plug and the retainer. An outer marginal portion of the diaphragm is held between the body and the bonnet, and the valve plug moves away from the valve seat, or the valve plug moves toward the valve seat and is seated on the valve seat. As a result, the diaphragm is deformed flexibly.

SUMMARY OF THE INVENTION

However, in the above described valve, since each of the central portion and the outer marginal portion of the diaphragm is held in a flat surface, when the diaphragm is deformed flexibly as a result of movement of the valve plug, wrinkles tend to be formed on the inner circumferential side, and cracks, etc. may be generated undesirably.

Further, in the case where an orifice hole is provided between the central portion and the outer marginal portion of the diaphragm, as a result of deformation of the diaphragm, cracks originating from the orifice hole tend to occur easily.

A general object of the present invention is to provide a valve which makes it possible to improve the durability of a diaphragm to a greater extent.

A valve of the present invention includes a body having a passage through which a pressurized fluid flows, a bonnet configured to cover an opening of the body, and a valve mechanism provided inside the body and the bonnet, and configured to switch a communication state of the passage. The valve mechanism includes a valve plug, a diaphragm in the form of a flexible sheet, and a holder configured to hold the central portion of the diaphragm between the valve plug and the holder. A central portion of the diaphragm is held against the valve plug, and an outer marginal portion of the diaphragm is held between the body and the bonnet. A pilot hole configured to allow the passage and a pilot chamber of the bonnet to communicate with each other is formed adjacent the central portion of the diaphragm. Central portions of the valve plug, the diaphragm, and the holder are stacked together, and fixed to each other by a tightening member.

In the present invention, the valve mechanism of the valve is provided inside the body having the passage and the bonnet covering the opening of the body. The valve mechanism includes the valve plug, the diaphragm, and the holder. The diaphragm is in the form of a flexible sheet, and the central portion of the diaphragm is held against the valve plug. The outer marginal portion of the diaphragm is held between the body and the bonnet. The holder is provided to hold the central portion of the diaphragm between the holder and the valve plug. The pilot hole is formed adjacent to the central portion of the diaphragm. The pilot hole allows the passage and the pilot chamber of the bonnet to communicate with each other.

Therefore, in comparison with the valve where the pilot hole is formed between the central portion and the outer marginal portion of the diaphragm, since the portion of the diaphragm where the pilot hole is formed is not subjected to deformation or deflection, formation of cracks originating from the pilot hole can be prevented. Consequently, it is possible to improve the durability of the diaphragm to a greater extent.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
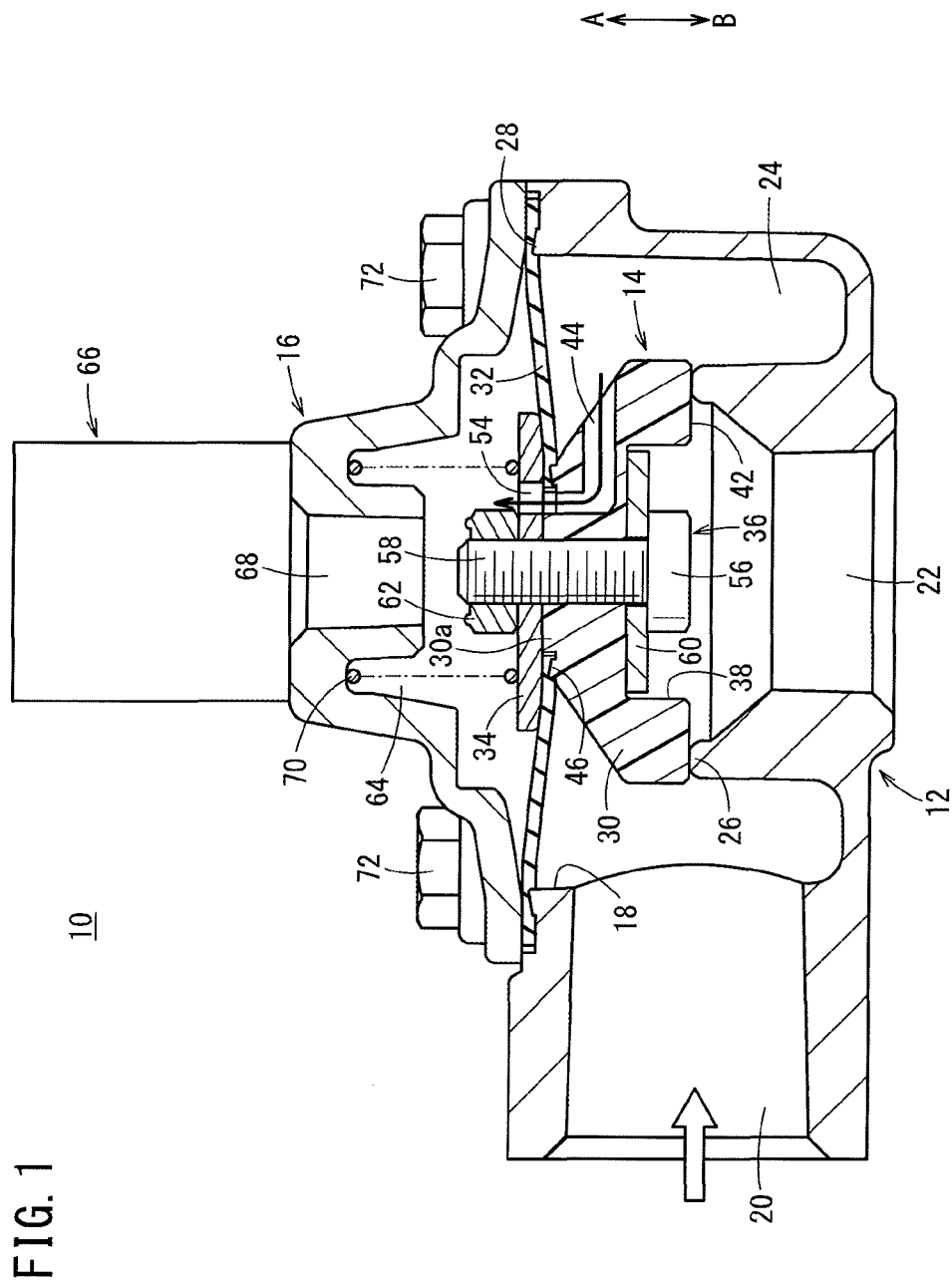
FIG. 1 is an overall cross sectional view showing a valve according to a first embodiment of the present invention.
Figure 2:
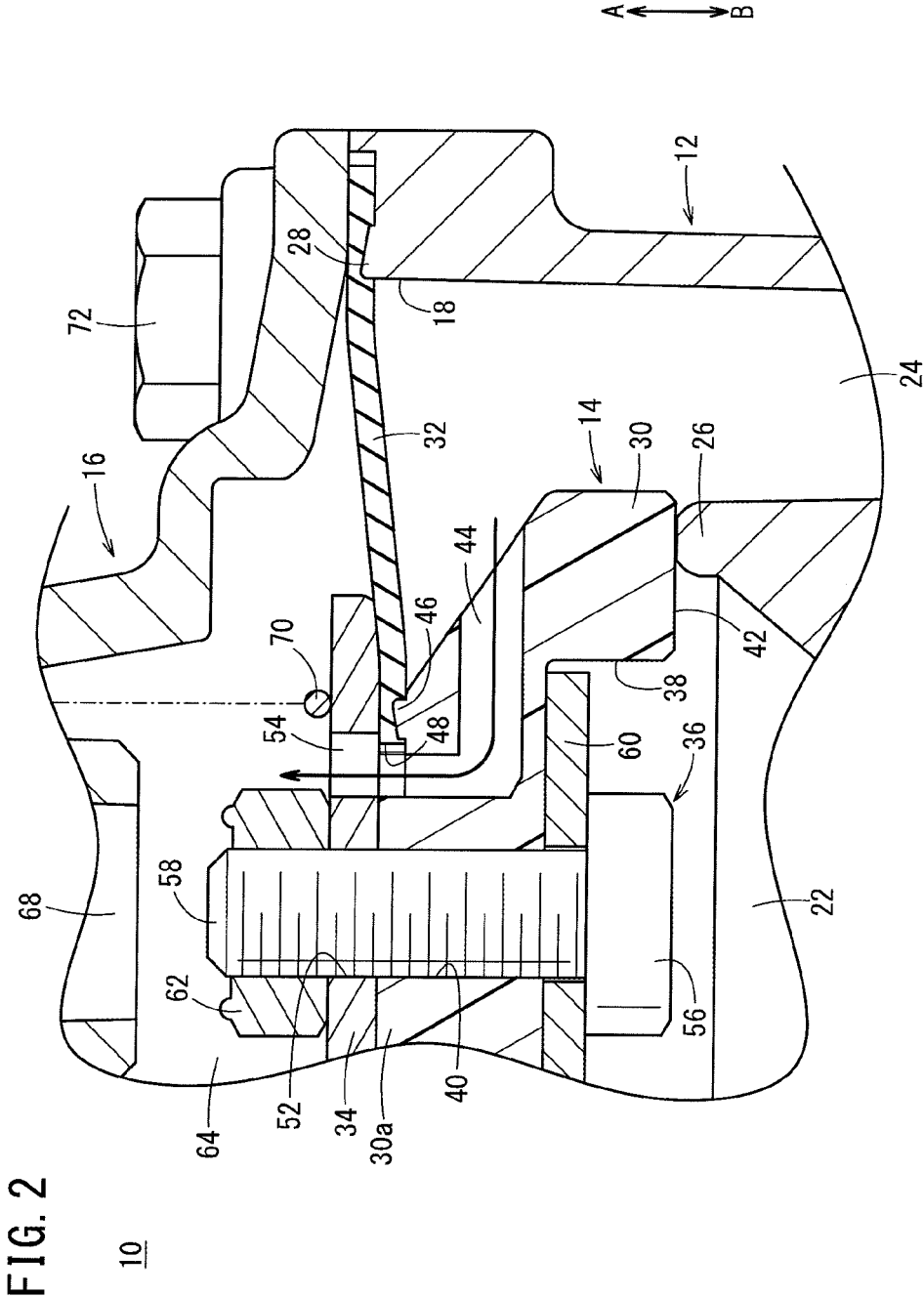
FIG. 2 is an enlarged cross sectional view showing a portion around a diaphragm of the valve in FIG. 1.

As shown in FIGS. 1 to 4, a valve 10 includes a body 12, a valve mechanism 14 placed in the body 12, and a bonnet 16 provided to cover an upper part of the body 12.

The body 12 is made of, e.g., a metal material, and includes an opening 18, a first port (inlet port) 20, a second port (outlet port) 22, and a communication chamber 24. The opening 18 has a circular shape, and is opened at an upper position (in the direction indicated by an arrow A) of the body 12. The first port 20 is opened at a lateral side position of the body 12. The second port 22 is opened at a lower position (indicated by an arrow B) of the body 12. The communication chamber 24 communicates with the first and second ports 20, 22. That is, the first port 20 and the second port 22 are substantially in perpendicular to each other.

A cylindrical wall of the second port 22 protrudes straight toward the communication chamber 24 (in the direction indicated by the arrow A), and a valve seat 26 is formed at an upper end of the second port 22. A valve plug 30 described later can be seated on the valve seat 26. An end of the second port 22 closer to the valve seat 26 is tapered in a manner that the inner diameter of the second port 22 is increased gradually toward the upper side (in the direction indicated by the arrow A).

Further, as shown in FIG. 1, the valve seat 26 is positioned adjacent to the axial center of the first port 20. Stated otherwise, the valve seat 26 and the axial center of the first port 20 have substantially the same height.

An annular first projection 28 is formed at an outer edge of the opening 18. The first projection 28 protrudes toward the upper side (in the direction indicated by the arrow A). The upper surface of the first projection 28 is inclined to get progressively lower, from the inner circumferential side protruding up to the highest position, toward the outer circumferential side.

The valve mechanism 14 includes the valve plug 30, a diaphragm 32 configured to abut against the valve plug 30, a holder member (holder) 34 for holding a central portion of the diaphragm 32 between the holder member 34 and the valve plug 30, and a fixing bolt 36 for supporting and fixing the valve plug 30, the diaphragm 32, and the holder member 34 in a state where these components abut against each other in the axial direction (indicated by the arrows A and B).

For example, the valve plug 30 is made of resin material, and has a trapezoidal-shaped cross section where the diameter of the valve plug 30 is increased gradually from an upper end to a lower end of the valve plug 30. The upper end of the valve plug 30 abuts against the central portion of the diaphragm 32. A boss 30a of the valve plug 30 protruding at the central portion is inserted into a first hole 48 of the diaphragm 32 to thereby position the valve plug 30 and the diaphragm 32 coaxially.

A bolt accommodating hole 38 for insertion of the fixing bolt 36 is formed at a central position of a lower end of the valve plug 30. The bolt accommodating hole 38 communicates with an insertion hole 40 penetrating through the valve plug 30 in the axial direction (indicated by the arrows A and B). A seating portion 42 in the form of a flat surface is formed around the bolt accommodating hole 38. The seating portion 42 can be seated on the valve seat 26. The seating portion 42 faces the valve seat 26.

Further, the valve plug 30 contains therein a pilot channel 44 which is opened at the tapered outer surface thereof. The pilot channel 44 extends radially inward (toward the center of the valve plug 30) with a substantially constant diameter, and then bends at a right angle toward the upper end of the valve plug 30 at a position spaced from the insertion hole 40 by a predetermined distance. Stated otherwise, the pilot channel 44 has an L-shape in cross section inside the valve plug 30. The pilot channel 44 passes through the valve plug 30 up to the upper end of the valve plug 30.

Further, an annular second projection 46 is formed at the upper end, in the outer marginal portion of the valve plug 30. The second projection 46 protrudes toward the upper side (in the direction indicated by the arrow A). The upper surface of the second projection 46 is inclined to get progressively lower, from the outer side protruding up to the highest position, toward the inner side.

The diaphragm 32 is, e.g., made of elastic material such as rubber, and in the form of a thin film (sheet) having a circular disk shape. A first hole 48 is formed at the center portion of the diaphragm 32. The fixing bolt 36 and the boss 30a of the valve plug 30 are inserted into the first hole 48. A part of the first hole 48 functions as a pilot hole. The first hole 48 penetrates through the diaphragm 32 in the thickness direction (indicated by arrows A and B) of the diaphragm 32. The first hole 48 faces toward and communicates with the pilot channel 44 of the adjacent valve plug 30.

Further, the first hole 48 is formed so as to have a clearance of a predetermined distance around the boss 30a of the valve plug 30. When the diaphragm 32 is held between the valve plug 30 and the holder member 34, and then pressed and deformed, the deformed portion of the diaphragm 32 can be released into the clearance on the inner side.

Further, a base fabric (not shown) is provided at the center of the diaphragm 32 in the thickness direction to achieve both of reduction in the thickness and improvement in the strength of the diaphragm 32.

Then, the central portion of the diaphragm 32 is held between the upper end of the valve plug 30 and the holder member 34. As a result, the second projection 46 bites into the diaphragm 32 to lock the diaphragm 32. In the meanwhile, the outer marginal portion of the diaphragm 32 is held between the body 12 and the bonnet 16. As a result, the first projection 28 bites into the diaphragm 32 to lock the diaphragm 32. That is, the first and second projections 28, 46 are formed such that a portion thereof that is closer to a bent portion of the diaphragm 32 is higher.

Further, a clearance is formed outside the outer marginal portion of the diaphragm 32 in the radial direction by a predetermined distance, between the body 12 and the bonnet 16. When the diaphragm 32 is held between the body 12 and the bonnet 16, and then pressed and deformed, the deformed portion of the diaphragm 32 can be released into the clearance on the outer side.

For example, the holder member 34 is made of metal material, and has a circular disk shape. The lower surface of the holder member 34 abuts against the valve plug 30 and a portion of the diaphragm 32 adjacent to the central portion, and a shaft part 58 of the fixing bolt 36 is inserted into a second hole 52 formed at substantially the central portion of the holder member 34.

Further, a pilot hole 54 is formed in the holder member 34 at a position outside the second hole 52 in the radial direction. The pilot hole 54, the first hole 48 of the diaphragm 32, and the other end of the pilot channel 44 in the valve plug 30 are arranged substantially in a straight line, and communicate with the inside of the bonnet 16.

For example, a head part 56 of the fixing bolt 36 is accommodated in the bolt accommodating hole 38 of the valve plug 30, and the shaft part 58 of the fixing bolt 36 which extends from the head part 56 in an axial direction (indicated by the arrow A) is inserted into the insertion hole 40 of the valve plug 30, the first hole 48 of the diaphragm 32, and the second hole 52 of the holder member 34. Further, a washer 60 is provided between the head part 56 and the valve plug 30, and a portion of the fixing bolt 36 protruding from the holder member 34 is screwed into a nut member 62. In the structure, in the state where the central portion of the diaphragm 32 is interposed between the valve plug 30 and the holder member 34, these components are fixed together.

The bonnet 16 is, e.g., made of metal material, and a pilot chamber 64 facing the valve mechanism 14 is formed at a central portion of the bonnet 16. A pilot port 68 is opened at an upper end at the center of the bonnet 16. The pilot port 68 is connected to a pilot valve 66.

A spring 70 is placed inside this pilot chamber 64. One end of the spring 70 is engaged with a step formed in an inner circumferential surface of the pilot chamber 64, and the other end thereof is placed to abut against the upper surface of the holder member 34. This spring 70 is, e.g., a coil spring wound in a spiral pattern. By the elastic force of the spring 70, the holder member 34 is biased toward the body 12 (in the direction indicated by the arrow B) all the time. The central portion of the diaphragm 32 and the valve plug 30 are accordingly biased toward the body 12 (in the direction indicated by the arrow B) together with the holder member 34. As a result, the valve plug 30 is pressed against, and seated on the valve seat 26.

The pilot port 68 communicates with an upper end of the pilot chamber 64 inside the bonnet 16. For example, the pilot valve 66 is a two way valve including a solenoid part which can be excited by energization. The pilot valve 66 is provided for the purpose of allowing communication between the pilot port 68 and the outside by opening a pilot valve plug under excitation operation of the solenoid part.

Further, in the state where the valve mechanism 14 is placed inside the bonnet 16, the bonnet 16 covers the opening 18 of the body 12. The bonnet 16 is coupled to the body 12 by screw engagement of a plurality of tightening bolts 72 with the body 12 in the axial direction. At this time, the lower end of the bonnet 16 directly contacts the upper end of the body 12. Therefore, the tightening force of the tightening bolts 72 is not directly applied to the outer marginal portion of the diaphragm 32 provided between the bonnet 16 and the body 12.

The valve 10 according to the first embodiment of the present invention basically has the structure as described above. Next operation, working effects, and advantages of the valve 10 will be described. In the following explanation, a valve closed state where the pilot valve 66 is connected to the pilot port 68 of the bonnet 16 and the valve plug 30 is seated on the valve seat 26 as shown in FIG. 1 will be referred to as an initial state.

Firstly, in this initial state, by the elastic force of the spring 70, the valve mechanism 14 is pressed toward the valve seat 26 (in the direction indicated by the arrow B), and pressurized fluid from a pressurized fluid supply source (not shown) is supplied into the communication chamber 24 through the first port 20.

The pressurized fluid partly flows into the pilot chamber 64 of the bonnet 16 through the pilot channel 44 opened to the communication chamber 24, the first hole 48, and the pilot hole 54. Therefore, by the pressure of the pressurized fluid, the valve plug 30, etc. is pressed toward the valve seat 26 (in the direction indicated by the arrow B). That is, the valve mechanism 14 including the valve plug 30 is pressed toward the valve seat 26 by the elastic force of the spring 70 and the pressure of the pressurized fluid.

In this case, since the pilot valve 66 is closed in the non-energized state, the pressurized fluid in the pilot chamber 64 is not discharged to the outside, and the pressure in the pilot chamber 64 is increased to a predetermined pressure.

Next, the solenoid part (not shown) of the pilot valve 66 is energized by a controller (not shown). As a result, the pilot valve plug is opened, and the pilot port 68 is opened to thereby discharge the pressurized fluid in the pilot chamber 64 to the outside gradually. As a result, the pressure in the pilot chamber 64 is lowered. Accordingly, since the valve plug 30 is biased toward the valve seat 26 only by the elastic force of the spring 70, the pressing force is reduced, and the valve plug 30 starts to move in a direction (indicated by the arrow A) away from the valve seat 26 in opposition to the elastic force.

That is, the elastic force of the spring 70 is not set to have the strength to keep the valve plug 30 seated on the valve seat 26 by the force of the spring 70 only, but set to have the strength which requires the pressure of the pressurized fluid in the pilot chamber 64 in combination, to place the valve 10 in the valve closed state.

Figure 3:
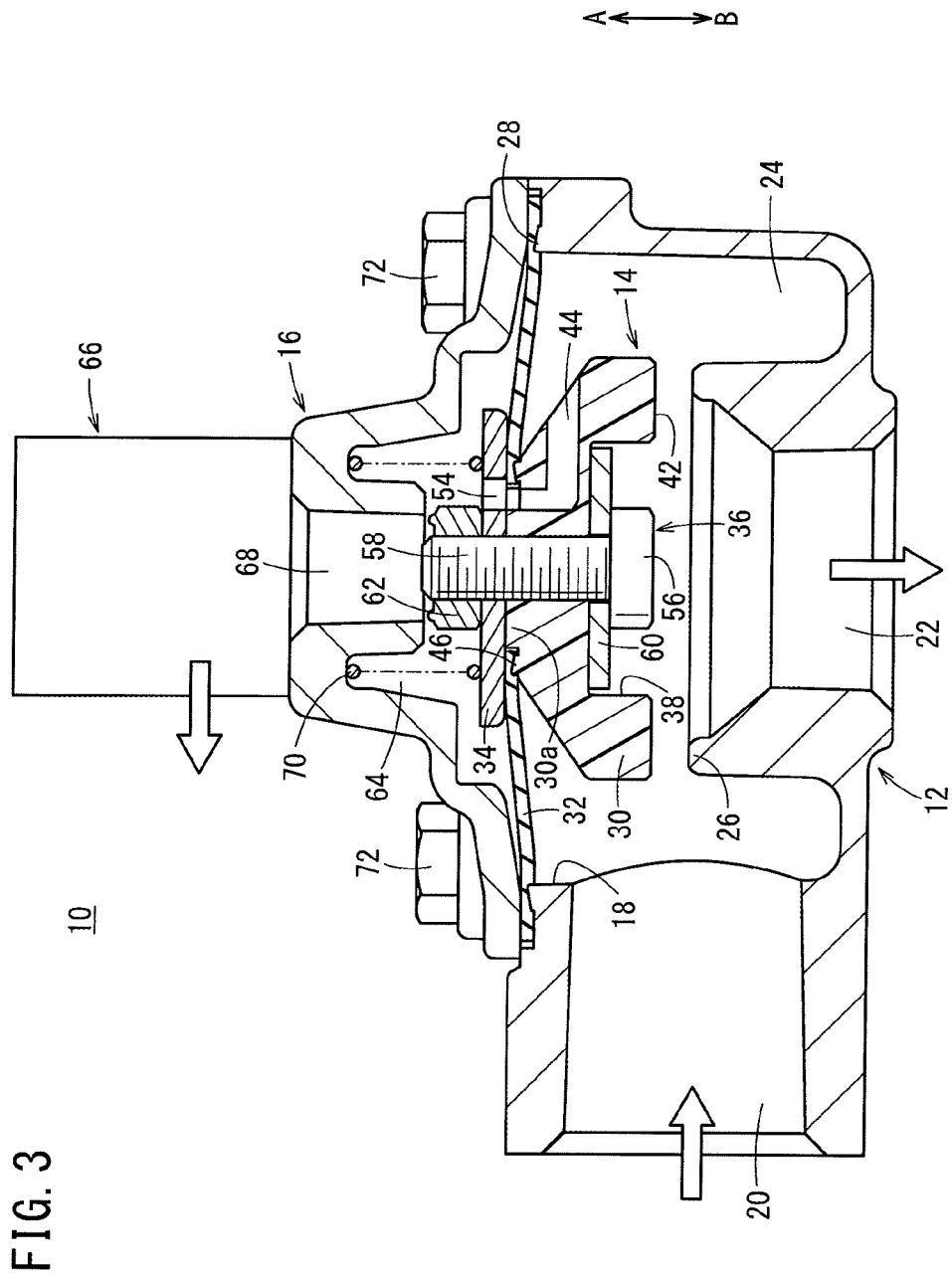
FIG. 3 is an overall cross sectional view showing a valve open state where the valve in FIG. 1 is separated from a valve seat.
Figure 4:
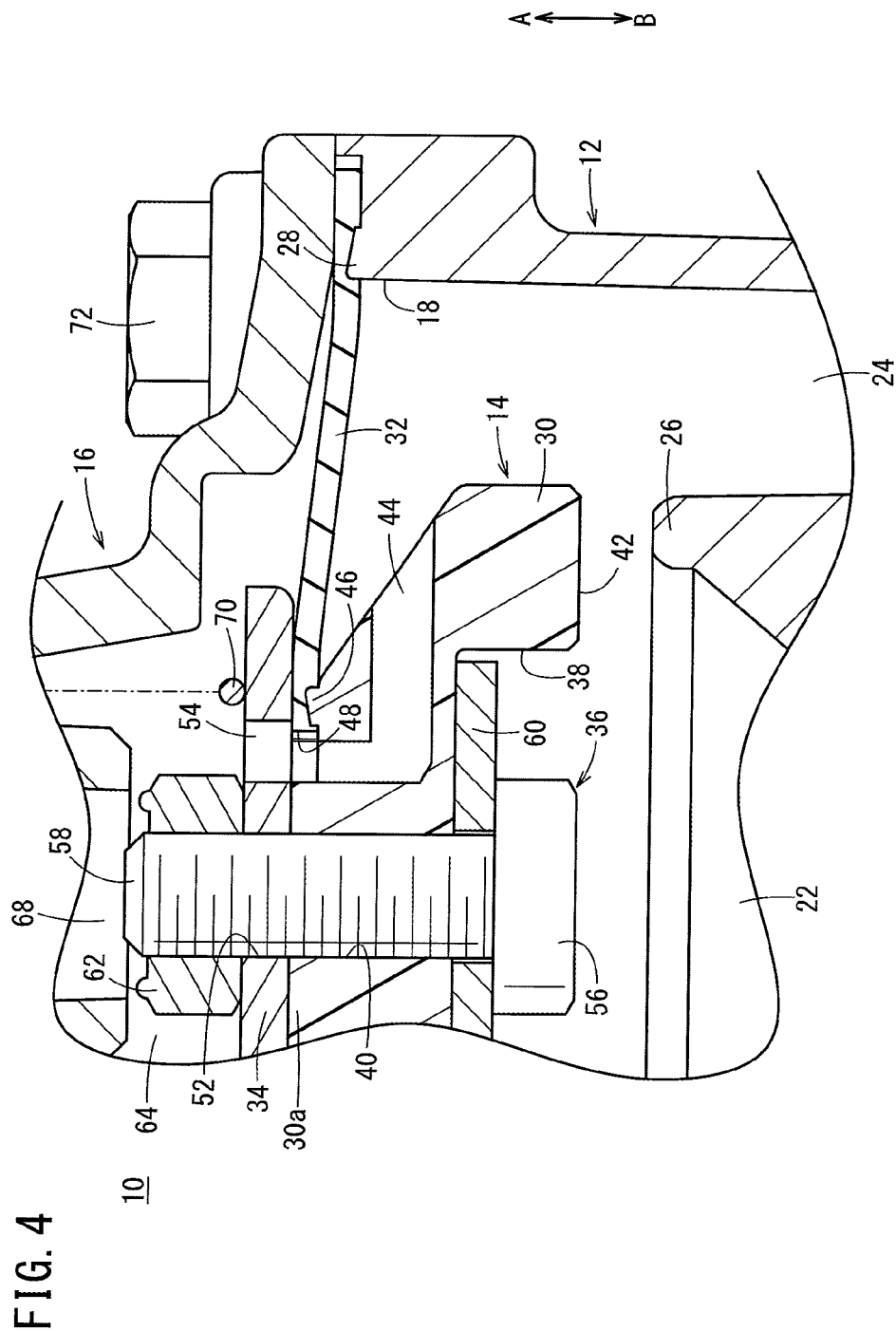
FIG. 4 is an enlarged cross sectional view showing a portion around a diaphragm of the valve in FIG. 3.

Then, as shown in FIGS. 3 and 4, the valve mechanism 14 including the valve plug 30 is completely separated from the valve seat 26 to place the valve 10 in the valve open state, and the pressurized fluid supplied to the first port 20 flows toward the second port 22 through the communication chamber 24, and the inside of the valve seat 26. Also in this case, under energization operation, the pilot valve 66 is placed in the valve open state.

In the case where the valve mechanism 14 including the valve plug 30 is seated on the valve seat 26 shown in FIG. 1 again for placing the valve 10 in the valve closed state, by stopping energization of the pilot valve 66, the pilot valve plug is placed in the valve closed state, and accordingly, the discharge of the pressurized fluid to the outside through the pilot port 68 is stopped.

Then, the interior of the pilot chamber 64 of the bonnet 16 is placed in the hermetically sealed state, and the pressure in the pilot chamber 64 is increased gradually by the pressurized fluid which flows into the pilot chamber 64 again, through the pilot channel 44, the first hole 48, and the pilot hole 54.

As a result, the valve mechanism 14 is pressed toward the valve seat 26 (in the direction indicated by the arrow B) by the pressure increase of the pressurized fluid, in addition to the elastic force of the spring 70 which biases the valve mechanism 14 all the time. The valve mechanism 14 is pressed toward the valve seat 26 to a greater extent by the continuous pressure increase. Therefore, the valve 10 is placed in the valve closed state where the seating portion 42 is seated on the valve seat 26 (see FIGS. 1 and 2). Consequently, the flow of the pressurized fluid from the first port 20 to the second port 22 through the communication chamber 24 is interrupted.

As described above, in the valve 10 of the first embodiment, the valve mechanism 14 is placed inside the body 12 and the bonnet 16. The pilot channel 44 opened to the communication chamber 24 of the body 12 is formed in the valve plug 30 of the valve mechanism 14. The first hole 48 communicating with the pilot channel 44 is also formed at the central portion of the diaphragm 32 held between the valve plug 30 and the holder member 34.

In the structure, in comparison with a valve where an orifice hole is formed between the central portion and the outer marginal portion of the diaphragm, since a portion of the diaphragm 32 where the first hole 48 is formed is not subjected to a deflection, formation of cracks originated from the first hole 48 is prevented. As a result, it becomes possible to improve the durability of the diaphragm 32.

Further, at the time of holding the outer marginal portion of the diaphragm 32 between the body 12 and the bonnet 16, by allowing the first projection 28 provided on the upper surface of the body 12 to bite into the diaphragm 32, it is possible to reliably hold the diaphragm 32. Further, the first projection 28 is in the form of the inclined surface which is progressively lowered from the inner circumferential side to the outer circumferential side. In the structure, when the diaphragm 32 is held between the body 12 and the bonnet 16, and the diaphragm 32 partly bulges, the bulging portion does not protrude toward the inner circumferential side, but protrudes toward the outer circumferential side. Therefore, it is possible to avoid formation of wrinkles on the bent portion of the diaphragm 32, which is a pressure receiving surface of the pressurized fluid.

Further, when the central portion of the diaphragm 32 is held between the valve plug 30 and the holder member 34, by allowing the second projection 46 formed on the upper surface of the valve plug 30 to bite into the diaphragm 32, it is possible to reliably hold the diaphragm 32. Further, the second projection 46 is in the form of the inclined surface which is progressively lowered from the outer circumferential side to the inner circumferential side. In the structure, when the diaphragm 32 is held between the valve plug 30 and the holder member 34, and the diaphragm 32 partly bulges, the bulging portion does not protrude toward the outer circumferential side, but protrudes toward the inner circumferential side. Therefore, it is possible to avoid formation of wrinkles on the bent portion of the diaphragm 32, which is a pressure receiving surface of the pressurized fluid.

That is, the first projection 28 and the second projection 46 are provided on the body 12 and the valve plug 30 which hold the outer marginal portion and the central portion of the diaphragm 32. The first projection 28 provided on the outer circumferential side is inclined to get progressively lower toward the outer circumferential side, and the second projection 46 provided on the inner circumferential side is inclined to get progressively lower toward the inner circumferential side. In the structure, when the diaphragm 32 is sandwiched and held to thereby bulge, the bulging portion does not protrude toward the bent portion of the diaphragm 32, which is the pressure receiving surface, and it is possible to suitably prevent formation of wrinkles.

Further, at the time of holding the diaphragm 32 between the body 12 and the bonnet 16, the end surface of the body 12 and the end surface of the bonnet 16 directly contact each other, and the most part of the tightening force in the axial direction by the tightening bolts 72 is received by the body 12 and the bonnet 16. Therefore, in comparison with the conventional valve, the force which is applied so as to press and deform the diaphragm 32 is suppressed. As a result, even in the case where elasticity of the diaphragm 32 is degraded, and a compression set occurs in the diaphragm 32, it is possible to prevent looseness of the tightening bolts 72.

Figure 5:
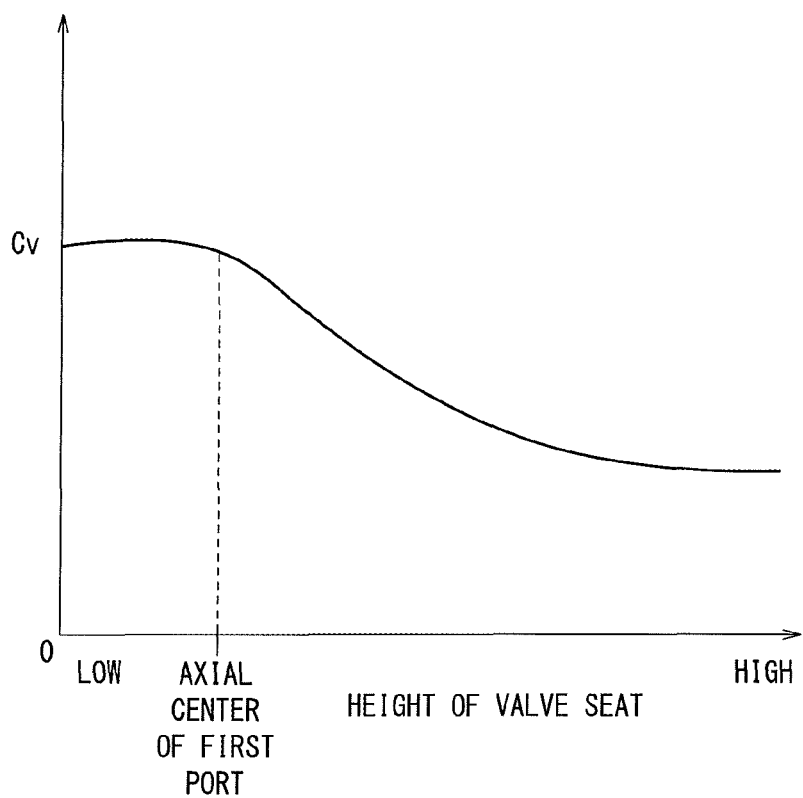
FIG. 5 is a graph of a characteristic curve showing the relationship between the height position of the valve seat of the valve and the Cv value indicating the flowability of fluid.

Further, as can be seen from the characteristic curve showing the relationship between the height of the valve seat 26 in the diaphragm 32 and the Cv value indicating the flowability of the pressurized fluid shown in FIG. 5, by designing the height of the valve seat 26 in the diaphragm 32 to the height of the axial center of the first port 20 which is lower than the conventional height, it is possible to improve the flow characteristics (Cv value) of the pressurized fluid in the valve 10 (see the broken line in FIG. 5).

That is, in comparison with the conventional valve where the valve seat is provided at a position higher than the axial center of the first port, in the valve 10 of the invention of the present application, the valve seat 26 is provided at the same height as the axial center of the first port 20. In this manner, it is possible to achieve improvement in the flow characteristics.

As a result, for example, when the same flow rate is set in the valves, in the valve 10, it is possible to shorten the movement distance of the valve plug 30 in the axial direction (indicated by the arrows A and B). Accordingly, it becomes possible to reduce the amount of deformation of the diaphragm 32 during movement of the valve plug 30. Therefore, the tension and/or the impact applied to the diaphragm 32 are reduced, and it is possible to achieve improvement in the durability to a greater extent.

Further, by providing the valve seat 26 adjacent to the axial center of the first port 20, it is possible to reduce the flow loss, and improve the flow characteristics when the pressurized fluid flows from the first port 20 to the second port 22 which is opened in the valve seat 26.

Next, a valve 100 according to a second embodiment will be described with reference to FIGS. 6 to 9. The constituent elements of the valve 100 according to the second embodiment that are identical to those of the valve 10 according to the first embodiment are labeled with the same reference numerals, and detailed description thereof is omitted.

The valve 100 according to the second embodiment is different from the valve 10 according to the first embodiment in that the valve mechanism of the valve 100 is only made up of a valve plug 102.

As shown in FIGS. 6 to 9, the valve 100 includes a body 104, a valve plug 102 placed inside the body 104, and a bonnet 106 provided to cover and close an upper part of the body 104.

The body 104 has an annular wall 110 provided upright around an opening 108 opened at an upper position (in the direction indicated by the arrow A) of the body 104. The bonnet 106 is partly inserted inside the annular wall 110.

Further, an annular groove 112 recessed downward (in the direction indicated by an arrow B) is formed inside the annular wall 110. A skirt part (diaphragm part) 116 of a valve plug 102 described later is inserted into and held by the annular groove 112. A first projection 28 is formed inside the annular groove 112.

The valve plug 102 is made of, for example, elastic resin material integrally, and includes a body part 114 formed at the center, and the skirt part 116 in the form of a thin film, extending radially outward from the body part 114. A hook 118 formed at an outer marginal portion 116a of the skirt part 116 is inserted into the annular groove 112 formed at the opening 108 of the body 104, and held between the annular groove 112 and the bonnet 106.

The body part 114 has a circular shape in cross section, and a lower end of the body part 114 faces the second port 22. A recess 120 concave in a direction away from the second port 22 is formed at the center of the lower end. A seating portion 122 is formed at an outer marginal portion outside the recess 120. The seating portion 122 can be seated on the valve seat 26. The seating portion 122 is formed to face the valve seat 26 of the body 104, and includes an annular protrusion 124 protruding toward the valve seat 26 (in the direction indicated by the arrow B). The width of the protrusion 124 in the radial direction is smaller than the width of the seating portion 122, and the protrusion 124 extends along the seating portion 122.

Further, a pilot channel 126 is opened on an outer circumferential surface of the body part 114. The pilot channel 126 extends radially inward, and thereafter the pilot channel 126 is bent at a right angle toward an upper end of the body part 114. Stated otherwise, the pilot channel 126 has an L-shape in cross section in the interior of the body part 114. The pilot channel 126 penetrates the body part 114, extending from the outer circumferential surface to the upper end.

The position of the opening of the pilot channel 126 on the outer circumferential surface of the body part 114 is between the seating portion 122 provided at the lower end of the body part 114 and the skirt part 116 provided adjacent to the upper end thereof. That is, the opening position of the pilot channel 126 is spaced downward (in the direction indicated by the arrow B) from the skirt part 116 by a predetermined distance in the axial direction of the valve plug 102 (in the direction indicated by the arrows A and B).

The skirt part 116 extends radially outward from the outer circumferential surface of the body part 114. The hook 118 protruding downward is formed at an outer marginal portion 116a of the skirt part 116. The hook 118 is inserted into the annular groove 112 of the body 104, and held between the annular groove 112 and the bonnet 106. An inner marginal portion 116b of the skirt part 116 is joined to a step 128 which is lowered stepwise from the upper end of the body part 114.

For example, the bonnet 106 includes a base part 130 having a circular disk shape, and a tubular part 132 protruding upward (in the direction indicated by the arrow A) from the center of the base part 130. A pilot port 68 is opened in the tubular part 132, and a pilot valve 66 is connected to the pilot port 68.

The base part 130 is inserted into the opening 108 of the body 104, and the annular wall 110 is engaged with a step 134 formed in a lower surface of the outer marginal portion of the base part 130. Further, a holder part 136 and a pilot chamber 138 are formed in a lower surface of the base part 130 facing the body 104. The holder part 136 is formed on the outer marginal portion of the base part 130, and holds the skirt part 116 of the valve plug 102. The pilot chamber 138 is formed inside the holder part 136 in the radial direction, and recessed toward the tubular part 132.

The pilot chamber 138 has a tapered shape where the inner wall is inclined radially inward from the holder part 136, gradually toward the tubular part 132 (in the direction indicated by the arrow A). The pilot chamber 138 includes a flat surface at its central portion. The pilot chamber 138 is provided to face the body part 114 and the skirt part 116 of the valve plug 102.

In the state where the skirt part 116 of the valve plug 102 is inserted into the annular groove 112 of the body 104, the bonnet 106 is inserted into and covers the opening 108 of the body 104, and in the state where the outer marginal portion 116a of the skirt part 116 is held between the holder part 136 and the body 104, a plurality of tightening bolts 72 are brought into screw engagement with the body 104 in the axial direction. In this manner, the bonnet 106 is coupled to the body 104.

In this regard, between the outer marginal portion 116a of the skirt part 116 and the annular wall 110 of the body 104, a clearance of a predetermined distance is provided around the outer marginal portion 116a in the radial direction. When the skirt part 116 is held between the body 104 and the bonnet 106, and then pressed and deformed, the deformed portion of the skirt part 116 can be released into the clearance on the outer circumferential side.

The valve 100 according to the second embodiment of the present invention basically has the structure as described above. Next, operation, working effects, and advantages of the valve 100 will be described. The valve 100 according to the second embodiment is operated basically in the same manner as the valve 10 according to the first embodiment. Therefore, the detailed description about the operation is omitted.

Figure 6:
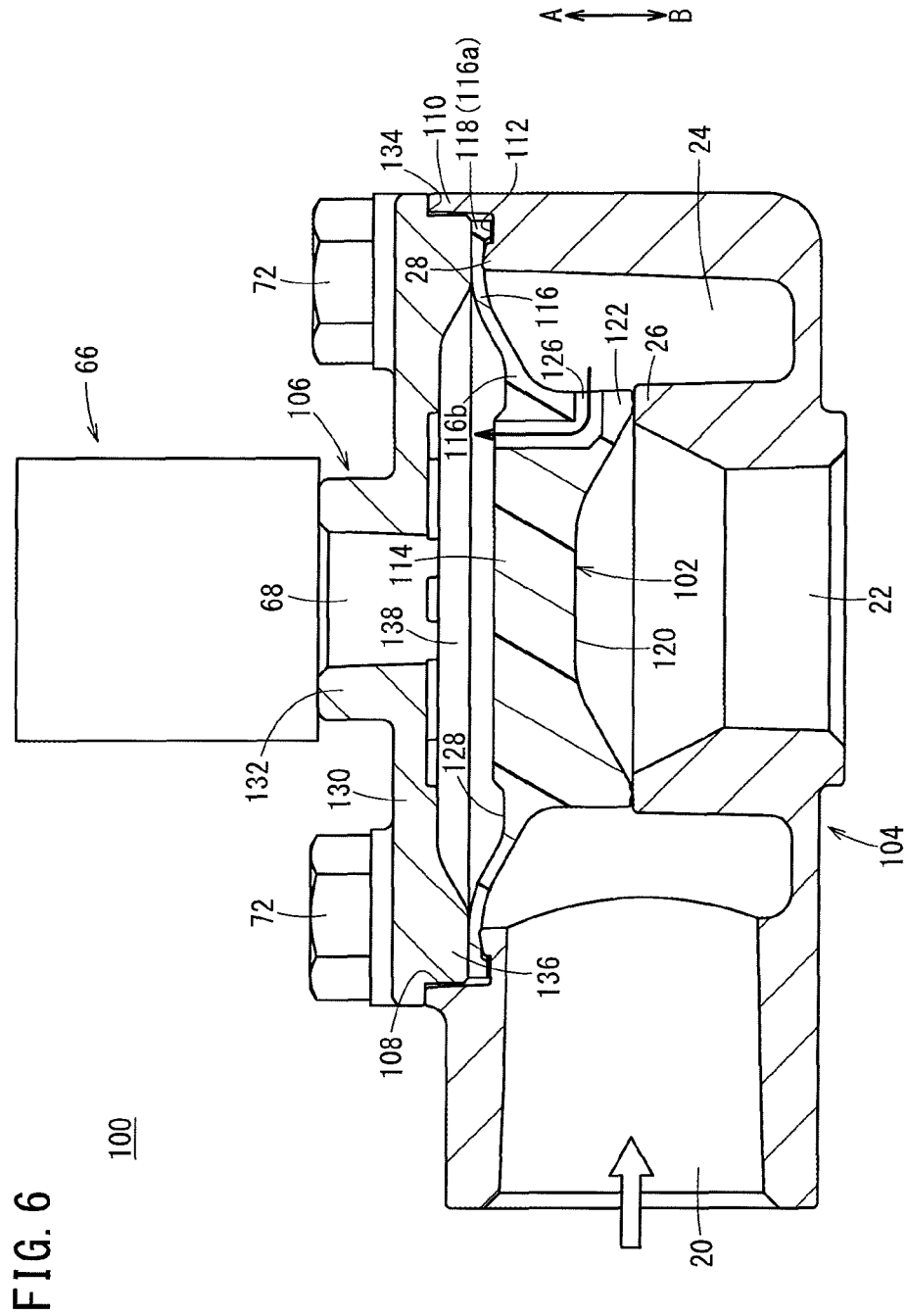
FIG. 6 is an overall cross sectional view showing a valve according to a second embodiment of the present invention.
Figure 7:
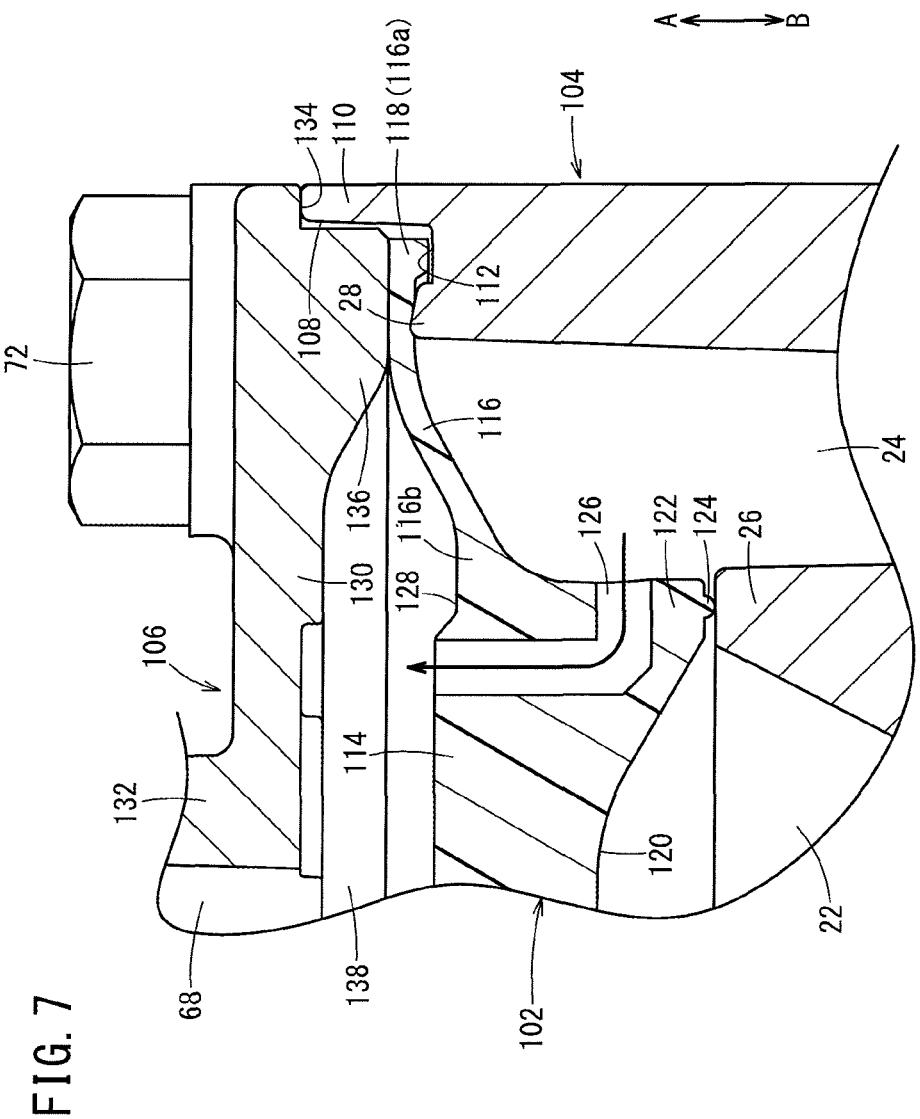
FIG. 7 is an enlarged cross sectional view showing a portion around a skirt part of a valve plug of the valve in FIG. 6.

Firstly, in the valve closed state where the valve plug 102 is seated on the valve seat 26 as shown in FIG. 6, the pressurized fluid is supplied from a pressurized fluid supply source (not shown) to the communication chamber 24 through the first port 20. The pressurized fluid flows through the pilot channel 126 opened to the communication chamber 24, and flows into the pilot chamber 138 of the bonnet 106. Consequently, by the pressure of the pressurized fluid, the valve plug 102 is pressed toward the valve seat 26 (in the direction indicated by the arrow B).

Next, upon energization of the pilot valve 66, the pilot port 68 is opened, and the pressurized fluid in the pilot chamber 138 is gradually discharged to the outside.

The pressure in the pilot chamber 138 is decreased to thereby reduce the pressing force applied to the valve plug 102. As a result, the valve plug 102 starts to move in a direction (indicated by the arrow A) away from the valve seat 26.

Figure 8:
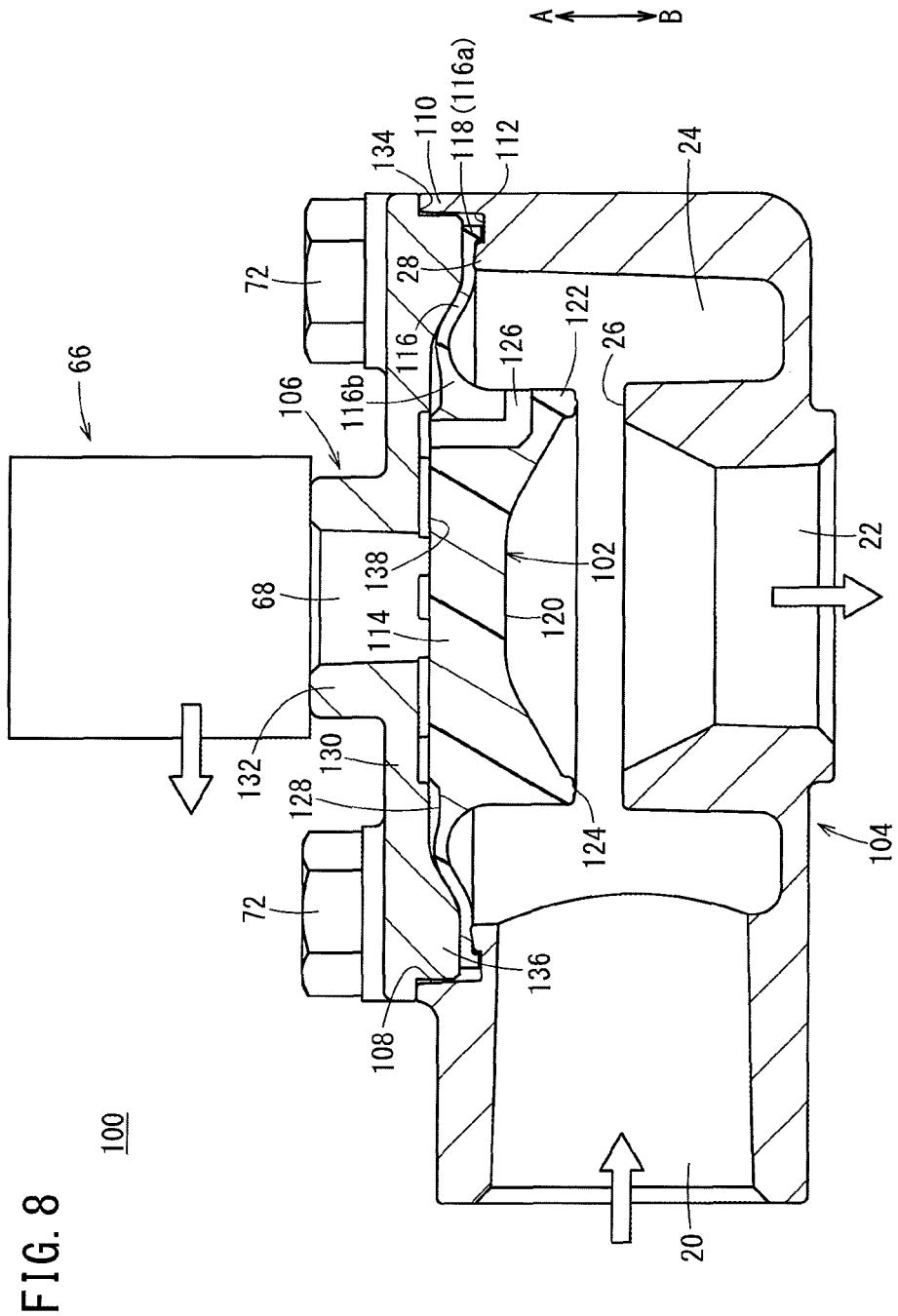
FIG. 8 is an overall cross sectional view showing a valve open state where the valve in FIG. 6 is separated from a valve seat.
Figure 9:
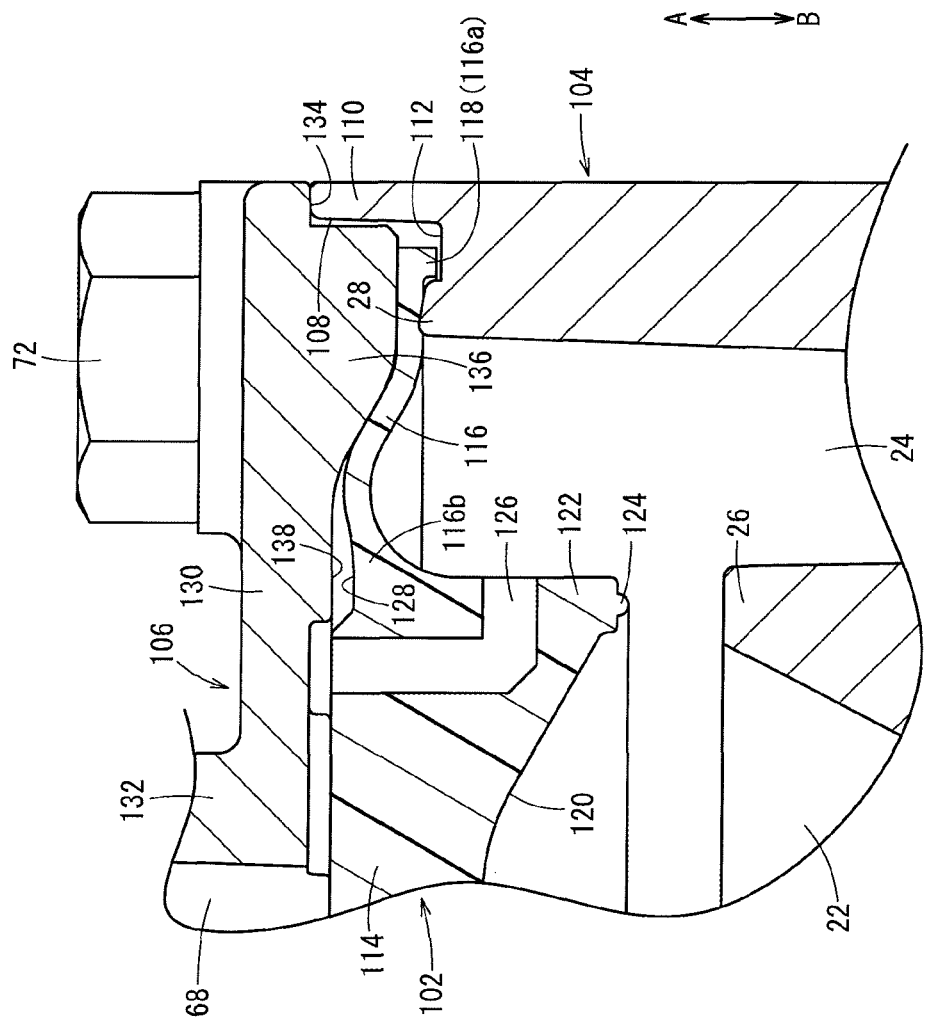
FIG. 9 is an enlarged cross sectional view showing a portion around a skirt part of a valve plug of the valve in FIG. 8.

Then, as shown in FIGS. 8 and 9, the valve plug 102 is completely separated away from the valve seat 26, and the upper end of the body part 114 abuts against the upper surface of the pilot chamber 138 of the bonnet 106 to thereby place the valve 100 in the valve open state, and the pressurized fluid supplied to the first port 20 flows toward the second port 22 through the communication chamber 24, and the inside of the valve seat 26.

In the case of placing the valve 100 into the valve closed state where the valve plug 102 is seated on the valve seat 26 as shown in FIG. 6, energization of the pilot valve 66 is stopped to thereby bring about the valve closed state, and accordingly, the discharge of the pressurized fluid from the pilot chamber 138 through the pilot port 68 is stopped. Then, the interior of the pilot chamber 138 of the bonnet 106 is sealed hermetically, and the pressure of the pilot chamber 138 is increased gradually by the pressurized fluid which flows into the pilot chamber 138 through the pilot channel 126 again.

In this manner, the valve plug 102 is pressed toward the valve seat 26 (in the direction indicated by the arrow B) by the pressure increase of the pressurized fluid in the pilot chamber 138, and the valve 100 is placed in the valve closed state where the seating portion 122 is seated on the valve seat 26. As a result, the flow of the pressurized fluid from the first port 20 to the second port 22 through the communication chamber 24 is interrupted.

As described above, in the valve 100 of the second embodiment, the valve plug 102 is provided inside the body 104. The valve plug 102 includes the body part 114 and the skirt part 116 that are formed integrally. The body part 114 can be seated on the valve seat 26 of the body 104. The skirt part 116 extends radially outward from the body part 114. In the structure, in comparison with the valve where an orifice hole is formed between the central portion and the outer marginal portion of the diaphragm, since the body part 114 where the pilot channel 126 is formed is not subjected to deformation (deflection), formation of cracks in the skirt part 116 is prevented. As a result, it becomes possible to improve the durability of the valve plug 102 including the skirt part 116.

Further, since the valve plug 102 includes the body part 114 and the skirt part 116 that are formed integrally, in comparison with the case where the body part 114 and the skirt part 116 are provided as separate members, it is possible to reduce the number of component parts. As a result, it is possible to reduce the production cost of the valve 100 including the valve plug 102, and reduce the number of assembling steps.

Further, since the valve plug 102 is made of elastic resin material, it is possible to absorb the impact and reduce operation sounds when the body part 114 is seated on the valve seat 26, and reduce wear of the valve seat 26, while improving the sealing performance when the body part 114 is seated on the valve seat 26.

Moreover, the valve plug 102 includes the body part 114 and the skirt part 116 that are formed integrally. In the structure, utilizing the restoring force of the resin material, it becomes possible to place the valve 100 in the valve closed state as shown in FIG. 1. Therefore, the spring 70 for biasing the valve plug 30 toward the valve seat 26 used in the valve 10 according to the first embodiment is no longer required. Accordingly, it becomes possible to reduce the number of component parts of the valve 100 to a greater extent.

Moreover, the opening position of the pilot channel 126 on the outer circumferential surface of the valve plug 102 is spaced downward (in the direction indicated by the arrow B) from the inner marginal portion 116b of the skirt part 116. In this manner, the joint position (inner marginal portion 116b) can be positioned below the holding position (outer marginal portion 116a) of the skirt part 116. Therefore, when the valve plug 102 moves upward (in the direction indicated by the arrow A), since a stress is applied such that the skirt part 116 shrinks in the radial direction, formation of cracks is prevented. As a result, it is possible to improve the durability of the valve plug 102 including the skirt part 116.

Further, by providing the step 128 at the upper end of the body part 114 of the valve plug 102, in the valve open state where the valve plug 102 has moved toward the bonnet 106 (in the direction indicated by the arrow A) as shown in FIG. 8, even in the case where the upper end of the body part 114 abuts against the pilot chamber 138 of the bonnet 106, the inner marginal portion 116b of the skirt part 116 does not tightly contact the pilot chamber 138, and the inner marginal portion 116b is spaced from the pilot chamber 138 by a predetermined distance. As a result, it is possible to avoid the situation where the entire skirt part 116 adheres to the bonnet 106 at the time of moving the valve plug 102 downward from the valve open state, and suppress the decrease in the workability resulting from the adhesion.

Further, since the thickness of the skirt part 116 of the valve plug 102 is reduced gradually from the inner marginal portion 116b joined to the body part 114 toward the outside in the radial direction, concentration of the stress applied to the inner marginal portion 116b when the skirt part 116 is bent as a result of opening/closing operation of the valve plug 102 is suppressed suitably. Accordingly, it becomes possible to improve the durability of the skirt part 116 to a greater extent.

Furthermore, since the valve plug 102 is made of resin material, the hook 118 in the form of a protrusion can be formed easily on the outer marginal portion 116a of the skirt part 116. Therefore, by providing the hook 118, it becomes possible to bring the skirt part 116 into engagement with the annular groove 112 of the body 104 to hold the skirt part 116 reliably, and prevent the skirt part 116 from coming off toward the inner side in the radial direction.

Moreover, by providing the annular protrusion 124 which protrudes toward the valve seat 26 (in the direction indicated by the arrow B), on the seating portion 122 of the valve plug 102, and bringing the protrusion 124 into abutment against the valve seat 26 in the valve closed state when the valve plug 102 is seated on the valve seat 26, it is possible to improve the sealing performance in the valve closed state to a greater extent.

Further, by providing the recess 120 at the lower end of the body part 114 of the valve plug 102, reduction in the weight of the body part 114 is achieved, and it is possible to suppress recession (sink) at the time of molding the valve plug 102.

It should be noted that the valve according to the present invention is not limited to the above described embodiments. It is a matter of course that various structures may be adopted without deviating from the scope of the present invention.

What is claimed is:

1. A valve comprising:
   a body having a passage through which a pressurized fluid flows;
   a bonnet configured to cover an opening of the body; and
   a valve mechanism provided inside the body and the bonnet, and configured to switch a communication state of the passage,
   the valve mechanism comprising:
   a valve plug;
   a diaphragm in a form of a flexible sheet, a central portion of the diaphragm being held against the valve plug, and an outer marginal portion of the diaphragm being held between the body and the bonnet;
   a holder configured to hold the central portion of the diaphragm between the valve plug and the holder;
   a pilot hole configured to allow the passage and a pilot chamber of the bonnet to communicate with each other the pilot hole being formed adjacent the central portion of the diaphragm; and
   a fastener fixing together central portions of the valve plug, the diaphragm, and the holder which are stacked together.

2. The valve according to claim 1, wherein the valve plug is partly inserted into the pilot hole, and a clearance in a radial direction is formed between the pilot hole and the valve plug.

3. The valve according to claim 1, wherein a pilot channel communicating with the pilot hole is formed in the valve plug.

4. The valve according to claim 1, wherein at least one of the body and the bonnet has a projection protruding in a thickness direction of the diaphragm, at a position holding the outer marginal portion; and
   an end of the projection facing the diaphragm has an inclined shape where a portion of the end corresponding to a bent portion of the diaphragm is highest in the end, and the end gets progressively lower in a direction away from the portion of the end corresponding to the bent portion.

5. The valve according to claim 4, wherein a clearance in a radial direction is formed between the outer marginal portion of the diaphragm and the body.

6. The valve according to claim 1, wherein at least one of the valve plug and the holder has a projection protruding in a thickness direction of the diaphragm, at a position holding the central portion of the diaphragm, and
   an end of the projection facing the diaphragm has an inclined shape where a portion of the end corresponding to a bent portion of the diaphragm is highest in the end, and the end gets progressively lower in a direction away from the portion of the end corresponding to the bent portion.

7. The valve according to claim 1, wherein a valve seat on which the valve plug is seated is formed adjacent to an axial center of an inlet port to which the pressurized fluid is supplied, and the inlet port is opened at a lateral side position of the body.

8. The valve according to claim 1, wherein the body includes an outlet port through which the pressurized fluid is discharged, and the outlet port has a tapered shape where an inner diameter of the outlet port is increased gradually toward inside of the body.

9. A valve comprising:
   a body having a passage through which a pressurized fluid flows;
   a bonnet configured to cover an opening of the body, to define a pilot chamber;
   a valve plug provided inside the body and the bonnet, and configured to switch a communication state of the passage between a passage open state and a passage closed state, the valve plug comprising a body part including a seating portion configured to be seated on a valve seat of the body, and a diaphragm part in a form of a flexible sheet, the diaphragm part extending radially outward from the body part; and
   a spring biasing the valve plug in a direction toward the passage closed state,
   wherein an outer marginal portion of the diaphragm part is held between the body and the bonnet; and
   a pilot channel in the valve plug and configured to allow the passage and the pilot chamber of the bonnet to communicate with each other,
   wherein at least one of the body and the bonnet has a projection protruding in a thickness direction of the diaphragm part, at a position holding the outer marginal portion;
   an end of the projection facing the diaphragm part has an inclined shape where a portion of the end corresponding to a bent portion of the diaphragm part is highest in the end, and the end gets progressively lower in a direction away from the portion of the end corresponding to the bent portion, and
   wherein a clearance in a radial direction is formed between the outer marginal portion of the diaphragm part and the body.

10. The valve according to claim 9, wherein a recess concave in a direction away from the valve seat is formed at an end of the body part facing the valve seat.

11. The valve according to claim 9, wherein a protrusion protruding toward the valve seat is formed on the seating portion.

12. The valve according to claim 9, wherein a spring force of the spring is not sufficient to cause the valve plug to switch the communication state of the passage to the passage closed state when a fluid pressure in the pilot chamber is less than a fluid pressure in the passage.

* * * * *